US012651543B2

(12) United States Patent
Wu et al.

(10) Patent No.: US 12,651,543 B2

(45) Date of Patent: Jun. 9, 2026

(54) DETECTION CIRCUIT, DETECTION METHOD, AND DISPLAY DEVICE

(71) Applicant: HKC CORPORATION LIMITED, Shenzhen (CN)

(72) Inventors: Meng Wu, Shenzhen (CN); Jun Hu, Shenzhen (CN); Zhenpeng Cao, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/250,841

(22) Filed: Jun. 26, 2025

(65) Prior Publication Data

US 2026/0011274 A1 Jan. 8, 2026

(30) Foreign Application Priority Data

Jul. 2, 2024 (CN) ......................... 202410875596.3

(51) Int. Cl.
*G09G 3/00* (2006.01)

(52) U.S. Cl.
CPC ....... *G09G 3/006* (2013.01); *G09G 2320/041* (2013.01); *G09G 2330/12* (2013.01)

(58) Field of Classification Search
CPC ............. G09G 3/006; G09G 2320/041; G09G 2330/12
See application file for complete search history.

(56) References Cited

U.S. PATENT DOCUMENTS

2007/0012897 A1 1/2007 Lee et al.
2009/0184953 A1* 7/2009 Yamashita ........... G09G 3/2022 345/212
2021/0104186 A1* 4/2021 Fujikawa ............. G09G 3/3611
2023/0252925 A1* 8/2023 Yang ...................... G09G 3/006 345/204
2023/0410755 A1 12/2023 An et al.
2025/0308478 A1* 10/2025 Bansho ............... G02F 1/13306

FOREIGN PATENT DOCUMENTS

CN 218004379 12/2022
CN 117636806 3/2024

OTHER PUBLICATIONS

CNIPA, Notification to Grant Patent Right for Invention for CN Application No. 202410875596.3, Aug. 5, 2024.

* cited by examiner

*Primary Examiner* — Premal R Patel

(74) *Attorney, Agent, or Firm* — Hodgson Russ LLP

(57) ABSTRACT

A display panel includes a display region and a non-display region. The detection circuit includes: a detection module, a detection line, and a temperature-sensing module. The detection module is arranged on the display panel; one end of the detection line is connected to the output end of the detection module, and another end of the detection line extends along the non-display region, surrounds the display region, and is connected to the receiving end of the detection module; the temperature-sensing module is connected to the detection line. The output end of the detection module provides a detection signal. The detection signal passes through the temperature-sensing module to form a feedback signal that changes with temperature. The receiving end of the detection module receives the feedback signal and determines the connection status of the detection line and the temperature change of the display panel based on the feedback signal.

20 Claims, 7 Drawing Sheets

DETECTION CIRCUIT, DETECTION METHOD, AND DISPLAY DEVICE

CROSS-REFERENCE TO RELATED APPLICATIONS

The present application claims priority to Chinese Patent Application No. 202410875596.3, filed on Jul. 2, 2024, the entire disclosure of which is hereby incorporated herein by reference.

TECHNICAL FIELD

The present application relates to the technical field of display, and particularly to a detection circuit, a detection method, and a display device.

BACKGROUND

In order to improve the display effect of the screen, the temperature of the display panel can be collected, and the screen display of the display can be adjusted based on the collected temperature. For example, the brightness of the backlight can be adjusted according to the collected temperature, to make the display screen clearer.

Currently, the temperature of the display panel is mainly collected by temperature sensors installed on the display panel, thereby completing collection of the temperature of the display panel. However, due to the limited space on the display panel, there are significant limitation to the installation of temperature sensors. Even if the installation can be completed, it will make the entire display panel bulky and may even interfere with the normal display of the screen.

SUMMARY

There is provided a detection circuit according to embodiments of the present application. The technical solution is as below.

According to first aspect of the embodiments of the present application, the present application provides a detection circuit, applied to a display panel, which includes a display region and a non-display region surrounding the display region; the detection circuit includes:

- a detection module, provided on the display panel;
- a detection line, with one end connected to an output end of the detection module, and another end extending along the non-display region, surrounding the display region, and connected to a receiving end of the detection module;
- a temperature-sensing module, connected to the detection line;
- the output end of the detection module provides a detection signal, the detection signal forms a feedback signal that varies with temperature through the temperature-sensing module, a receiving end of the detection module receives the feedback signal and determines a connection state of the detection line and a temperature change of the display panel based on the feedback signal.

According to a second aspect of the embodiments of the present application, the present application also provides a detection method, the detection method detects a display panel based on a detection circuit, and the display panel includes a display region and a non-display region surrounding the display region; the detection circuit includes: a detection module, a detection line, and a temperature-sensing module; the detection module is provided on the display panel, one end of the detection line is connected to an output end of the detection module, and another end of the detection line extends along the non-display region, surrounds the display region, and is connected to a receiving end of the detection module; the temperature-sensing module is connected to the detection line;

the detection method includes:

- controlling the output end of the detection module to provide a detection signal, wherein the detection signal is transmitted to the temperature-sensing module through the detection line, the temperature-sensing module forms a feedback signal that varies with temperature based on the detection signal; and
- controlling the receiving end of the detection module to receive the feedback signal and determining a connection state of the detection line and a temperature change of the display panel based on the feedback signal.

According to a third aspect of the embodiments of the present application, the present application also provides a display device, which includes a display panel and the detection circuit as mentioned above; the detection module and the temperature-sensing module are provided in the non-display region of the display panel or at the edge of the display panel.

It should be understood in the present application that the above general description and the subsequent detailed description are only exemplary and explanatory, and shall not limit the present application.

BRIEF DESCRIPTION OF THE DRAWINGS

The accompanying drawings here are incorporated into the specification and constitute a part of this specification, showing the embodiments that conform to the present application, and are used together with the specification to explain the principles of the present application. Obviously, the accompanying drawings in the following description are only some embodiments of the present application. For those skilled in the art, other accompanying drawings can be obtained based on these accompanying drawings without creative efforts.

DETAILED DESCRIPTION OF THE EMBODIMENTS

The exemplary embodiments will now be described more comprehensively with reference to the accompanying drawings. However, the exemplary embodiments can be implemented in various forms and should not be construed as being limited to the examples provided forth herein; rather, these embodiments are provided so that the present application will be more thorough and complete, and will fully convey the concept of the exemplary embodiments to those skilled in the art.

The First Embodiment

Figure 1:
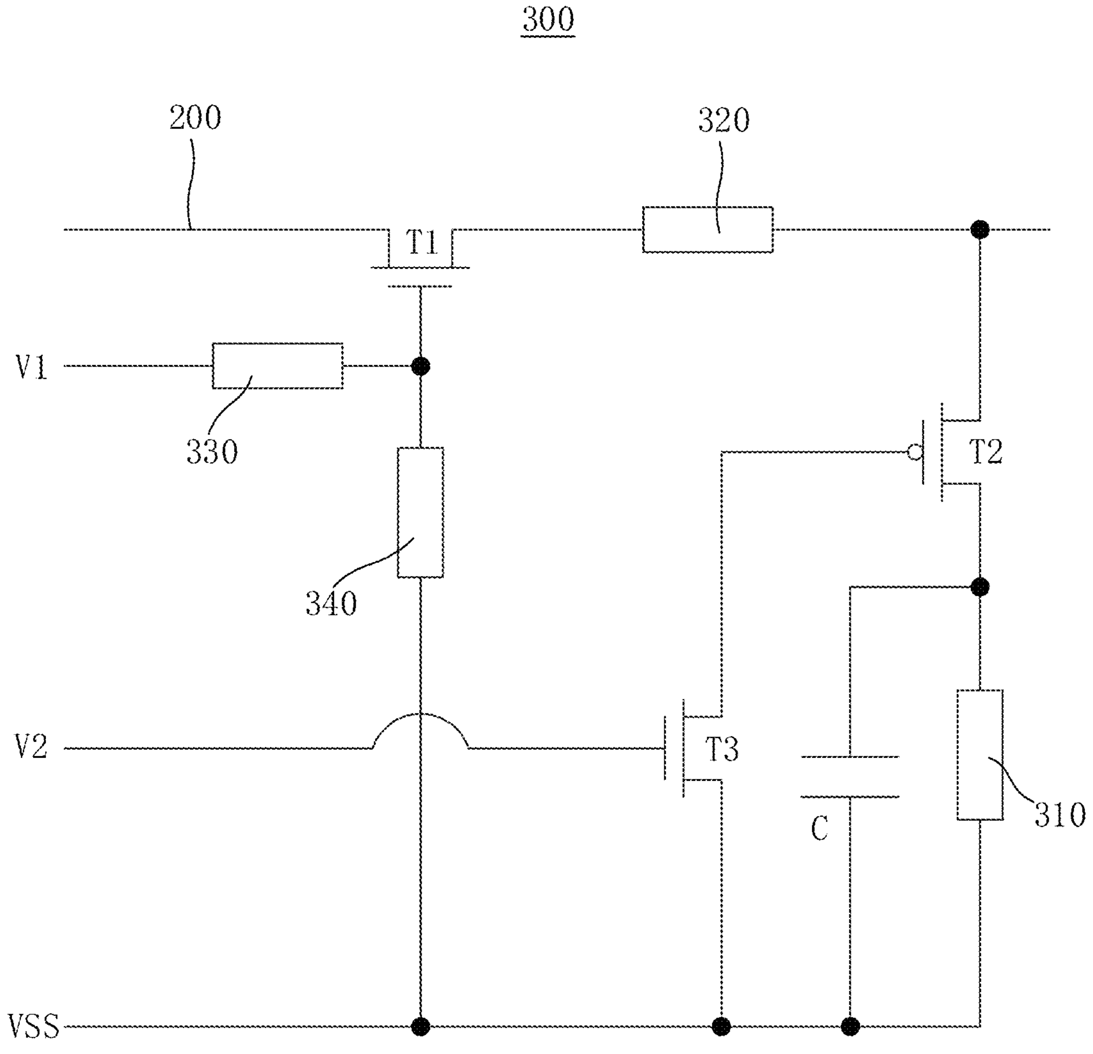
FIG. 1 schematically shows a structural schematic diagram of the detection circuit of the present application.
Figure 2:
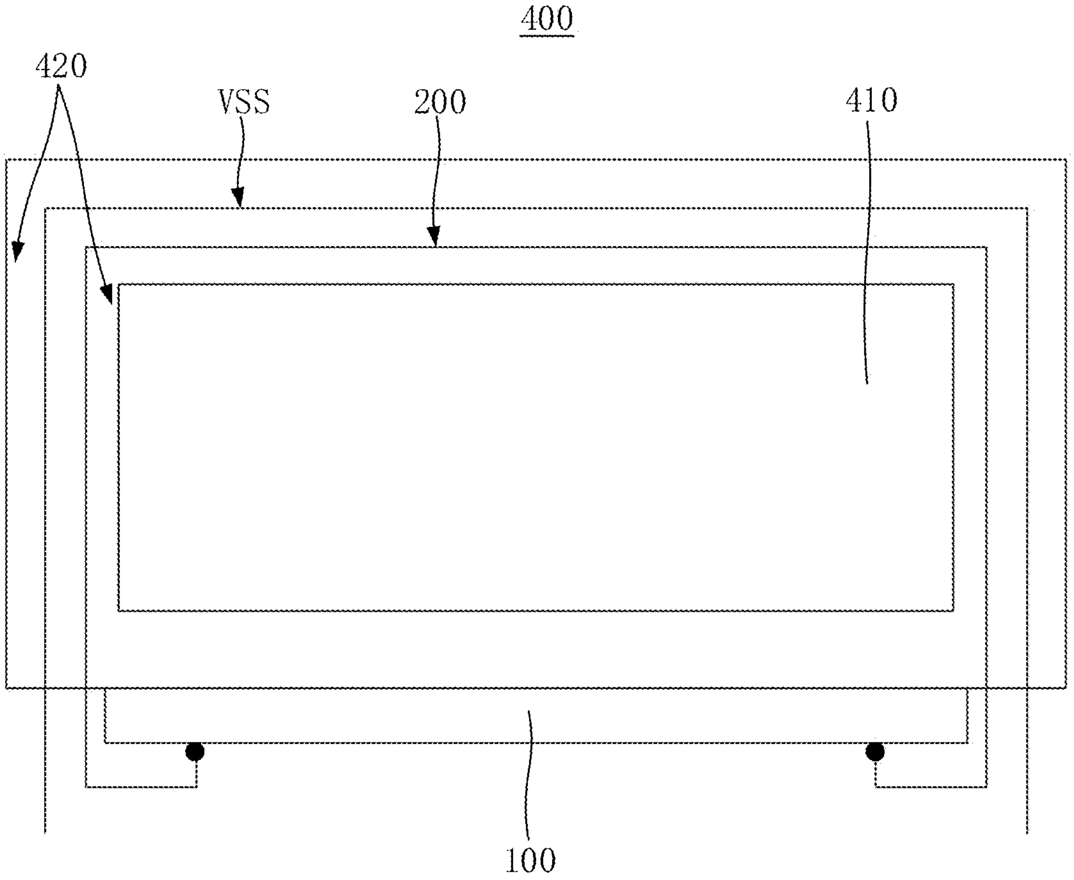
FIG. 2 schematically shows a structural schematic diagram of the display panel of the present application.
Figure 3:
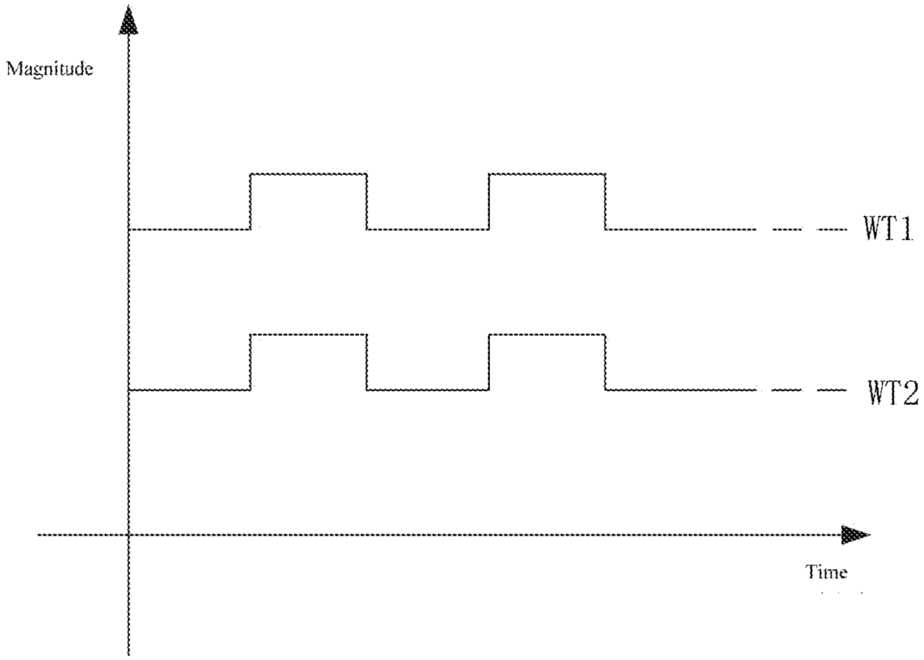
FIG. 3 schematically shows a schematic diagram in which the detection signal of the detection circuit of the present application is a square wave.
Figure 4:
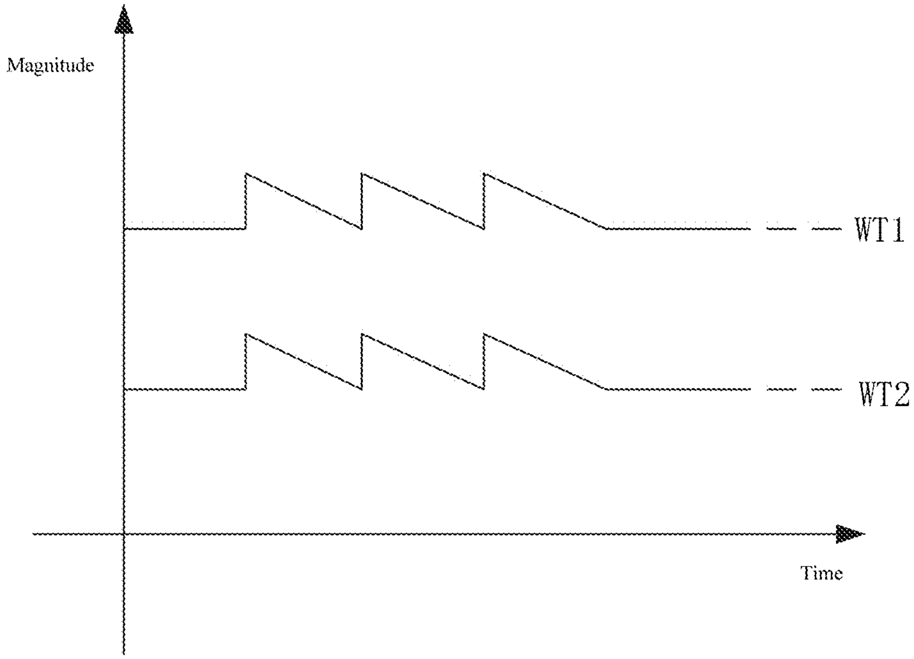
FIG. 4 schematically shows a schematic diagram in which the detection signal of the detection circuit of the present application is a triangular wave.
Figure 5:
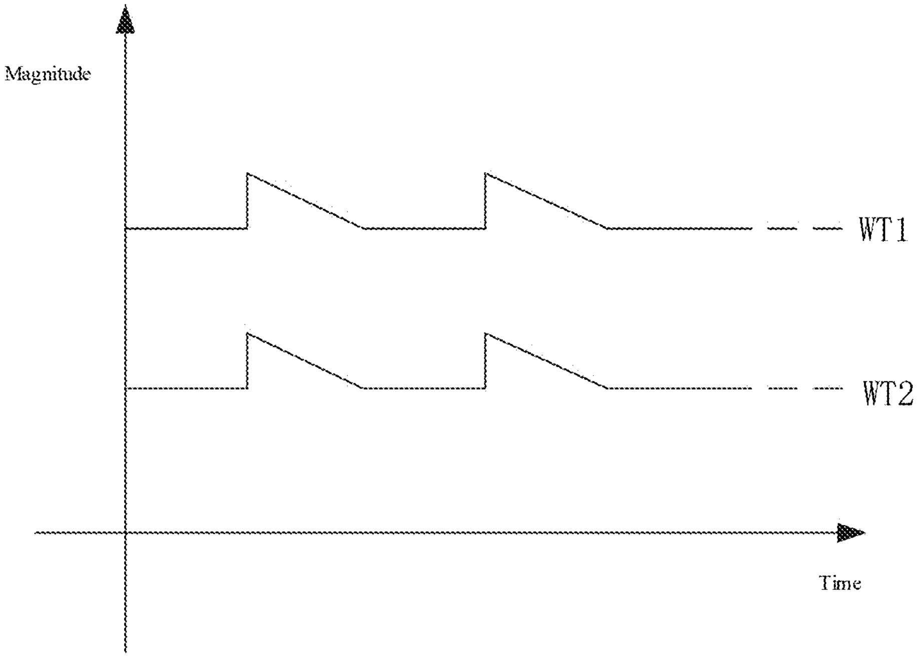
FIG. 5 schematically shows another schematic diagram in which the detection signal of the detection circuit of the present application is a triangular wave.
Figure 6:
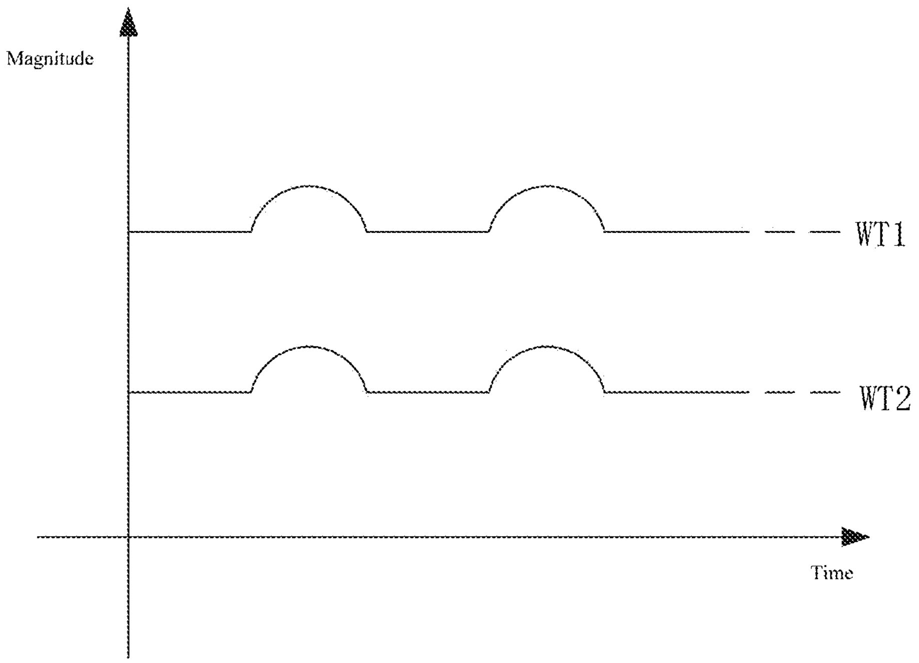
FIG. 6 schematically shows a schematic diagram in which the detection signal of the detection circuit of the present application is a semi-circular wave.

As shown in FIGS. 1 and 2, the present application provides a detection circuit, which is applied to a display panel 400. The display panel 400 in the embodiment of the present application can be a liquid crystal panel or other types of display panels 400. For example, it can also be an Organic Light-Emitting Diode (OLED) panel. The display panel 400 includes a display region 410 and a non-display region 420 surrounding the display region 410. The display region 410 is mainly used for screen display, and some driving lines or components can be laid in the non-display region 420.

The detection circuit includes: a detection module 100, a detection line 200, and a temperature-sensing module 300.

The detection module 100 is provided on the display panel 400; the detection module 100 can be provided in the non-display region 420 or at the side of the display panel 400. The detection module 100 is mainly used to send a detection signal and receive a feedback signal.

One end of the detection line 200 is connected to the output end of the detection module 100, and another end of the detection line 200 extends along the non-display region 420, surrounds the display region 410, and is connected to the receiving end of the detection module 100. Thus, it can be seen that the detection line 200 is provided around the display region 410, and can surround the display region 410 for a full circle or a half circle. For example, if the display region 410 is square, the detection line 200 can be provided around three sides of the display region 410.

The temperature-sensing module 300 is connected to the detection line 200. The temperature-sensing module 300 can monitor the temperature change of the surrounding environment, and the temperature-sensing module 300 can also be provided in the non-display region 420 or at the side of the display panel 400. The output end of the detection module 100 provides a detection signal. The detection signal forms a feedback signal that varies with temperature through the temperature-sensing module 300. The receiving end of the detection module 100 receives the feedback signal and determines the connection state of the detection line 200 and the temperature change of the display panel 400 based on the feedback signal.

In this embodiment, after the detection signal passes through the temperature-sensing module 300, a feedback signal that varies with temperature is formed. After the receiving end of the detection module 100 receives the feedback signal, it can detect the feedback signal, and the temperature change of the display panel 400 can be obtained through the feedback signal, thus completing the temperature detection of the display panel 400, and since the temperature-sensing module 300 is provided on the detection line 200, and the detection line 200 is provided in the non-display region 420, the impact on the screen can be reduced in the non-display region 420. Thus, it can be seen that the arrangement of the temperature-sensing module 300 can make the structure of the display panel 400 neater, thereby also reducing the impact on the display screen.

Furthermore, in the present application, the display panel 400 may be broken due to external forces sometimes. In order to detect whether the display panel 400 is broken, the connection state of the detection line 200 can also be determined through the feedback signal, that is, to determine whether the detection line 200 is in a conducting state or a broken state, so as to determine whether the display panel is broken. If the receiving end of the detection module 100 does not receive the feedback signal, it indicates that the detection line 200 has been broken, which means that the display panel 400 is broken. If the receiving end of the detection module 100 can receive the feedback signal, it indicates that the detection line 200 is still in a conducting state, and the display panel 400 is in conducting state and not broken.

As can be seen from the above, the technical solution of the present application can not only detect the temperature change of the display panel 400 through the temperature-sensing module 300, but also detect whether the display panel 400 is intact or broken.

In an embodiment of the present application, the temperature-sensing module 300 includes a first responsive switch T1. The resistance in the first responsive switch T1 varies with temperature. The first responsive switch T1 is provided on the detection line 200. The input end of the first responsive switch T1 is connected to the output end of the detection module 100 through the detection line 200, and the output end of the first responsive switch T1 is connected to the receiving end of the detection module 100 through the detection line 200. The control end of the first responsive switch T1 is connected to the first power supply end V1, and the first power supply end V1 provides a first control signal.

The control end of the first responsive switch T1 responds to the first control signal, and the input end and the output end of the first responsive switch T1 are conducted. In this way, the detection line 200 can be conducted, and the detection signal can pass through the first responsive switch T1. The change of the resistance of the first responsive switch T1 with temperature can be reflected in the detection signal, thus forming a feedback signal. For example, the first responsive switch T1 can be a Thin-Film Transistor (TFT). As a semiconductor device, the TFT is affected by its channel resistance during operation. If its channel resistance is smaller, the conductivity of the channel is stronger, and the conducting current is also larger. Basically, the source will output the corresponding current according to the current input to the drain. Conversely, the larger the channel resistance is, the weaker the conductivity of the channel is, and the smaller the conducting current is.

When used at room temperature, the TFT is relatively stable, its channel resistance is relatively stable, and there will be no obvious leakage current change, and its switch state is fixed. When the ambient temperature of the used TFT changes, there is an obvious shift in the transfer characteristic curve of the TFT. After the ambient temperature rises, the electron mobility in the TFT becomes larger, the conducting current becomes larger, and the transfer characteristic curve of the TFT at high temperature shifts obviously upward compared with that at room temperature. After the ambient temperature drops, the electron mobility in the TFT becomes smaller, the conducting current becomes smaller, and the transfer characteristic curve of the TFT at low temperature shifts obviously downward compared with that at room temperature. Thus, it can be seen that by detecting how much the feedback signal passing through the first responsive switch T1 deviates from the detection signal, the connection state of the detection line 200 and the temperature change of the display panel 400 can be determined.

In an embodiment of the present application, the temperature-sensing module 300 further includes a feedback resistor 310. One end of the feedback resistor 310 is connected to the detection line 200 between the first responsive switch T1 and the receiving end of the detection module 100, and another end of the feedback resistor 310 is connected to the ground line VSS. The ground line VSS provides a ground voltage, and the ground voltage provided by the ground line VSS is lower than the voltage of the detection signal to ensure that the current flows from the detection line 200 through the feedback resistor 310 to the ground line VSS.

The feedback signal includes a feedback voltage flowing through the feedback resistor 310 and a feedback current flowing through the first responsive switch T1. The temperature change of the display panel 400 can be determined through the feedback voltage, and the connection state of the detection line 200 can be determined through the feedback current.

The detection module 100 detects the magnitude of the feedback current to determine the connection state of the detection line 200; more specifically, it can be to detect whether the feedback current exists. If the detection module 100 can detect the feedback current, it indicates that the detection line 200 is in a connected state. If the detection module 100 cannot detect the feedback current, it indicates that the detection line 200 is in a broken state.

The detection module 100 detects the magnitude of the feedback voltage to determine the temperature change of the display panel 400. After the feedback current passes through the feedback resistor 310, a feedback voltage is formed on the feedback resistor 310. The magnitude of the feedback resistor 310 generally remains unchanged. When the resistance of the first responsive switch T1 varies with temperature, the magnitude of the feedback current passing through the first responsive switch T1 also varies with temperature. Thus, it can be seen that the temperature change of the display panel 400 can be obtained through the change of the feedback voltage.

It should be pointed out that in this embodiment, the temperature change of the display panel 400 can also be directly determined through the magnitude of the feedback current. Then, the feedback current and the feedback voltage can be combined to jointly determine the temperature change of the display panel 400, and the result of this dual detection is more accurate.

In order to reduce short circuits, in an embodiment of the present application, the temperature-sensing module 300 further includes a protection resistor 320. The protection resistor 320 is provided in the detection line 200 between the output end of the first responsive switch T1 and the feedback resistor 310. The receiving end of the detection module 100 is connected to the line between the protection resistor 320 and the feedback resistor 310. Through the arrangement of the protection resistor 320, the direct connection of the output end and the receiving end of the detection module 100 is avoided, and the situation of short circuits in the detection module 100 is reduced.

In an embodiment of the present application, the temperature-sensing module 300 further includes a protection capacitor C. The protection capacitor C is connected in parallel with the feedback resistor 310. One end of the protection capacitor C is connected to the detection line 200 between the first responsive switch T1 and the receiving end of the detection module 100, and another end of the protection capacitor C is connected to the ground line VSS. The protection capacitor C can maintain the stability of the voltage on the feedback resistor 310 and reduce the fluctuations of the feedback voltage caused by the interference of other noise signals. That is, the protection capacitor C can not only maintain the stability of the feedback voltage but also has a certain filtering effect, to make the detection of the feedback voltage by the detection module 100 more accurate, the accuracy of the temperature detection of the display panel 400 is improved.

In an embodiment of the present application, the temperature-sensing module 300 further includes a first resistor 330 and a second resistor 340. One end of the first resistor 330 is connected to the first power supply end V1, and another end of the second resistor 340 is connected to the control end of the first responsive switch T1. One end of the second resistor 340 is connected to the line between the first resistor 330 and the first responsive switch T1, and another end of the second resistor 340 is connected to the ground line VSS. Through the arrangement of the first resistor 330 and the second resistor 340, the first voltage signal of the first power supply end V1 can be shared, ensuring that the voltage acting on the control end of the first responsive switch T1 can turn on the first responsive switch T1.

The first power supply end V1 provides a first voltage signal, and the first voltage signal is divided by the first resistor 330 to form a first control signal. For example, if the voltage of the first voltage signal of the first power supply end V1 is Vg, the resistance of the first resistor 330 is R1, and the resistance of the second resistor 340 is R2, then the voltage of the first control signal is $Vg\times[R1/(R1+R2)]$, and this voltage can control the first responsive switch T1 to turn on.

In addition, it should be noted that the first power supply end V1 can be directly connected to the control end of the first responsive switch T1, and the first power supply end V1 provides a first control signal to directly control the on or off of the first responsive switch T1, so that the circuit is more concise.

In an embodiment of the present application, the temperature-sensing module 300 further includes a second responsive switch T2 and a third responsive switch T3. The input end of the second responsive switch T2 is connected to the output end of the first responsive switch T1, and the output end of the second responsive switch T2 is connected to the feedback resistor 310. The input end of the third responsive switch T3 is connected to the control end of the second responsive switch T2, and the output end of the third responsive switch T3 is connected to the ground line VSS. The control end of the third responsive switch T3 is connected to the second power supply end V2.

The second power supply end V2 provides a second control signal. The control end of the second responsive switch T2 responds to the second control signal, and the input end and the output end of the second responsive switch T2 are conducted. The voltage at the control end of the third responsive switch T3 is pulled down to the ground voltage provided by the ground line VSS, and the input end and the output end of the third responsive switch T3 are conducted, and a feedback voltage is formed on the feedback resistor 310.

In addition, it is also possible that the second power supply end V2 directly controls the on or off of the second responsive switch T2.

From the above, it can be seen that the types of the second responsive switch T2 and the third responsive switch T3 are different. In an embodiment of the present application, the second responsive switch T2 is a PMOS transistor, and the third responsive switch T3 is an NMOS transistor. The control end of the second responsive switch T2 responds to a low-level signal, causing its input and output ends to conduct. The control end of the third responsive switch T3 responds to a high-level signal, causing its input and output ends to conduct. The feedback current in the first responsive switch T1 is positively correlated with the temperature change of the display panel 400. The higher the temperature of the display panel 400, the larger the feedback current. Conversely, the lower the temperature of the display panel 400, the smaller the feedback current.

The input end of the responsive switch can be regarded as the drain, its output end can be regarded as the source, and its control end can be regarded as the gate. Of course, the source can also be considered as the input end and the drain can be considered as the output end.

In an embodiment of the present application, the ground line VSS is provided in the non-display region 420 and at least surrounds part of the display region 410. The ground line VSS can provide a ground voltage of 0V, can be parallel to the detection line 200 and can maintain in-plane uniformity. In this embodiment, the arrangement of the ground line VSS can be fully utilized to make the output end of the detection module 100, the detection line 200, the temperature-sensing module 300, and the ground line VSS form a conductive loop. The receiving end of the detection module 100 is used to collect signals.

The Second Embodiment

Figure 7:
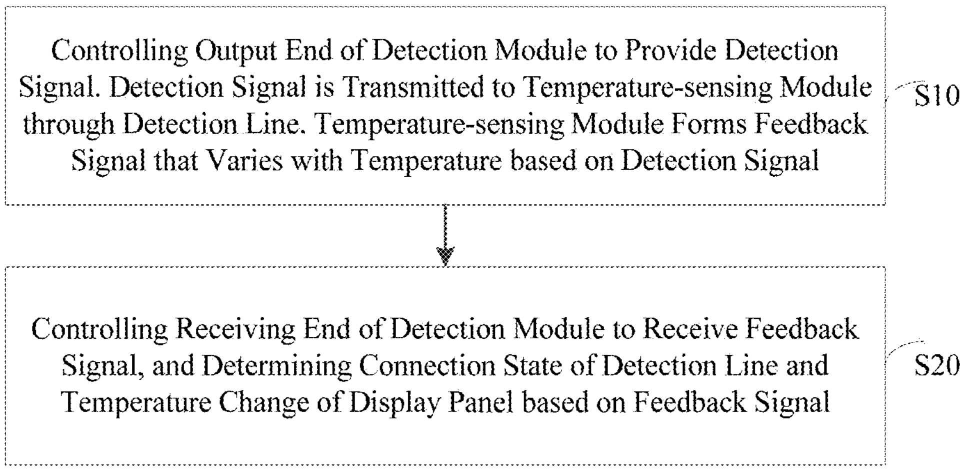
FIG. 7 schematically shows a flowchart of the detection method of the present application.
Figure 8:
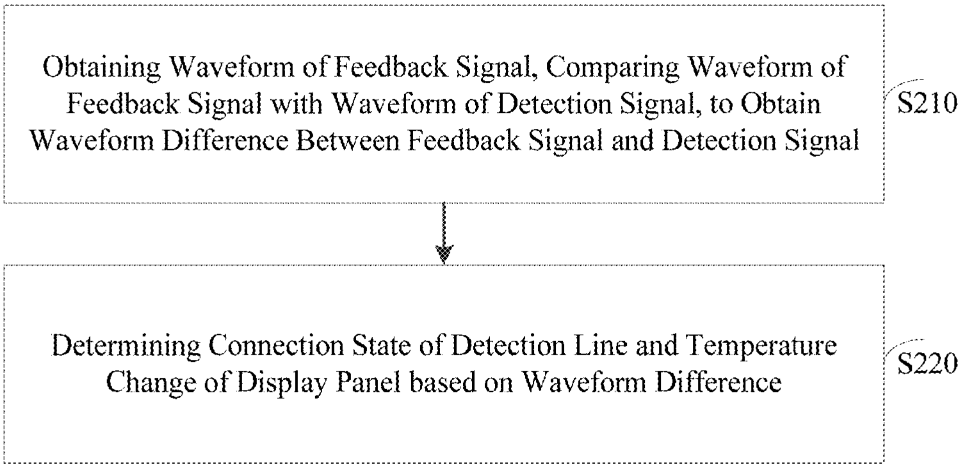
FIG. 8 schematically shows a flowchart for determining the temperature change based on the waveform difference in the detection method of the present application.

As shown in FIG. 7, the present application also provides a detection method. The detection method is used to detect the display panel 400 based on a detection circuit. The display panel 400 includes a display region 410 and a non-display region 420 surrounding the display region 410. The detection circuit includes: a detection module 100, a detection line 200, and a temperature-sensing module 300. The detection module 100 is provided on the display panel 400; one end of the detection line 200 is connected to the output end of the detection module 100, and another end of the detection line 200 extends along the non-display region 420, surrounds the display region 410, and is connected to the receiving end of the detection module 100; the temperature-sensing module 300 is connected to the detection line 200.

The detection method includes:

Step S10: Controlling the output end of the detection module 100 to provide a detection signal. The detection signal is transmitted to the temperature-sensing module 300 through the detection line 200. The temperature-sensing module 300 forms a feedback signal that varies with temperature based on the detection signal. For example, the temperature-sensing module 300 includes a first responsive switch T1. The resistance in the first responsive switch T1 varies with temperature. The first responsive switch T1 can be the TFT. The resistance of the first responsive switch T1 changes positively with temperature. The higher the temperature, the larger the current flowing through the first responsive switch T1. Conversely, the lower the temperature, the lower the current flowing through the first responsive switch T1, or even no current flows. Thus, the temperature change can be reflected in the feedback signal.

Step S20: Controlling the receiving end of the detection module 100 to receive the feedback signal, and determining the connection state of the detection line 200 and the temperature change of the display panel 400 based on the feedback signal. The detection module 100 can extract the temperature change information of the display panel 400 from the feedback signal.

In this embodiment, after the detection signal passes through the temperature-sensing module 300, the feedback signal that varies with temperature is formed. After the receiving end of the detection module 100 receives the feedback signal, it can detect the feedback signal, and the temperature change of the display panel 400 can be obtained through the feedback signal, thus completing the temperature detection of the display panel 400, and since the temperature-sensing module 300 is provided on the detection line 200, and the detection line 200 is provided in the non-display region 420, the devices in the non-display region 420 will not interfere with the display screen in the display region 410. Therefore, the arrangement of the temperature-sensing module 300 can make the structure of the display panel 400 neater, thereby reducing the impact on the display screen.

Furthermore, in this embodiment, the connection state of the detection line 200 can also be determined through the feedback signal, that is, to determine whether the detection line 200 is in a conducting state or a broken state, and then to determine whether the display panel is broken. If the receiving end of the detection module 100 does not receive the feedback signal, it indicates that the detection line 200 has been broken, which means that the display panel 400 is broken. If the receiving end of the detection module 100 can receive the feedback signal, it indicates that the detection line 200 is still in the conducting state, and the display panel 400 is intact and not broken.

As shown in FIGS. 3 to 6 and FIG. 8, the step of determining the connection state of the detection line 200 and the temperature change of the display panel 400 based on the feedback signal includes:

Step S210: Obtaining the waveform of the feedback signal, comparing the waveform of the feedback signal with the waveform of the detection signal, to obtain the waveform difference between the feedback signal and the detection signal. The feedback signal can be a sine wave, a triangular wave, a saw-tooth wave, a square wave, or a semi-circular wave. The waveform of the detection signal is W1 and the waveform of the feedback signal is W2.

Step S220: Determining the connection state of the detection line 200 and the temperature change of the display panel 400 based on the waveform difference. If the detection line 200 is intact and the display panel 400 is not broken, the shapes of the W1 waveform and the W2 waveform are the same. If the temperature of the display panel 400 changes, the distance between the W1 waveform and the W2 waveform will change. For example, when the temperature rises, the W2 waveform gets closer to the W1 waveform; when the temperature drops, the W2 waveform moves away from the W1 waveform. In the specific comparison process, a longitudinal same point on the W1 waveform and the W2 waveform can be selected, or the average values of the W1 waveform and the W2 waveform can be calculated respectively, and then the difference between the W1 waveform and the W2 waveform is compared with a preset value. The preset value can be understood as the difference between the W1 waveform and the W2 waveform at room temperature. If the difference between the W1 waveform and the W2 waveform is greater than the preset value, it indicates that the temperature has dropped. If the difference is less than the preset value, it indicates that the temperature has risen.

Figure 9:
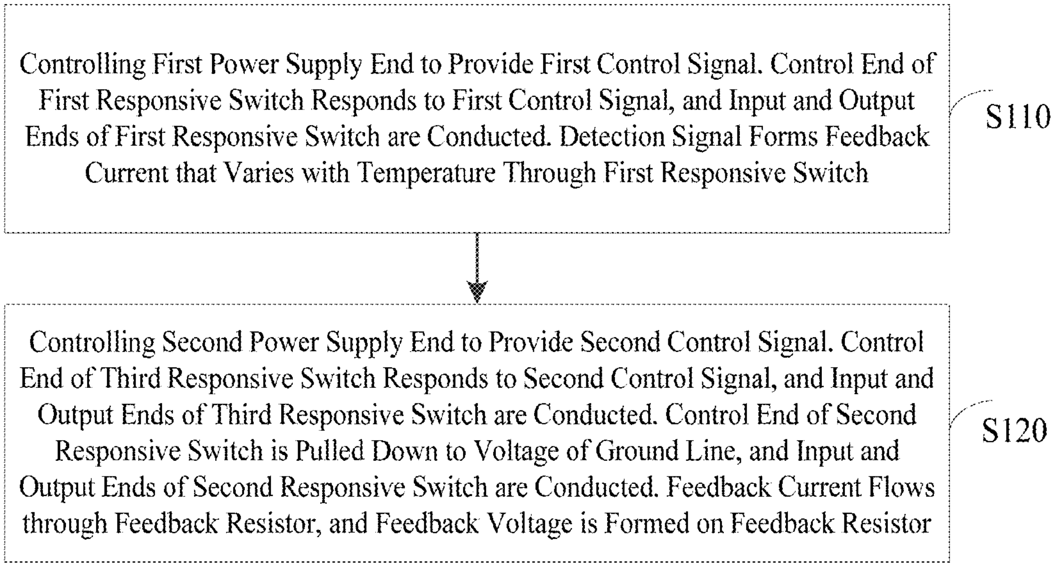
FIG. 9 schematically shows a flowchart for forming the feedback current and the feedback voltage in the detection method of the present application.

As shown in FIGS. 1 and 9, the detection circuit also includes: a first responsive switch T1, a second responsive switch T2, a third responsive switch T3, and a feedback resistor 310. The resistance in the first responsive switch T1 varies with temperature. The first responsive switch T1 is provided on the detection line 200. The input end of the first responsive switch T1 is connected to the output end of the detection module 100 through the detection line 200, and the output end of the first responsive switch T1 is connected to the receiving end of the detection module 100 through the detection line 200. The control end of the first responsive switch T1 is connected to the first power supply end V1, and the first power supply end V1 provides a first control signal. One end of the feedback resistor 310 is connected to the detection line 200 between the first responsive switch T1 and the receiving end of the detection module 100, and another end of the feedback resistor 310 is connected to the ground line VSS.

The input end of the second responsive switch T2 is connected to the output end of the first responsive switch T1, and the output end of the second responsive switch T2 is connected to the feedback resistor 310. The input end of the third responsive switch T3 is connected to the control end of the second responsive switch T2, and the output end of the third responsive switch T3 is connected to the ground line VSS. The control end of the third responsive switch T3 is connected to the second power supply end V2.

The step of controlling the output end of the detection module 100 to provide the detection signal, the detection signal being transmitted to the temperature-sensing module 300 through the detection line 200, and the temperature-sensing module 300 forming the feedback signal that varies with temperature based on the detection signal includes:

Step S110: Controlling the first power supply end V1 to provide a first control signal. The control end of the first responsive switch T1 responds to the first control signal, and the input and output ends of the first responsive switch T1 are conducted. The detection signal forms a feedback current that varies with temperature through the first responsive switch T1.

Step S120: Controlling the second power supply end V2 to provide a second control signal. The control end of the third responsive switch T3 responds to the second control signal, and the input and output ends of the third responsive switch T3 are conducted. The control end of the second responsive switch T2 is pulled down to the voltage of the ground line VSS, and the input and output ends of the second responsive switch T2 are conducted. The feedback current flows through the feedback resistor 310, and a feedback voltage is formed on the feedback resistor 310.

Therefore, the temperature change and the fragmentation of the display panel 400 can be detected separately. That is, step S110 is used to detect the fragmentation of the display panel 400, and step S120 is used to detect the temperature change of the display panel 400.

To illustrate the specific process of the detection method in detail, the following is an example: the detection module 100 includes a control unit and a detection unit.

Figure 10:
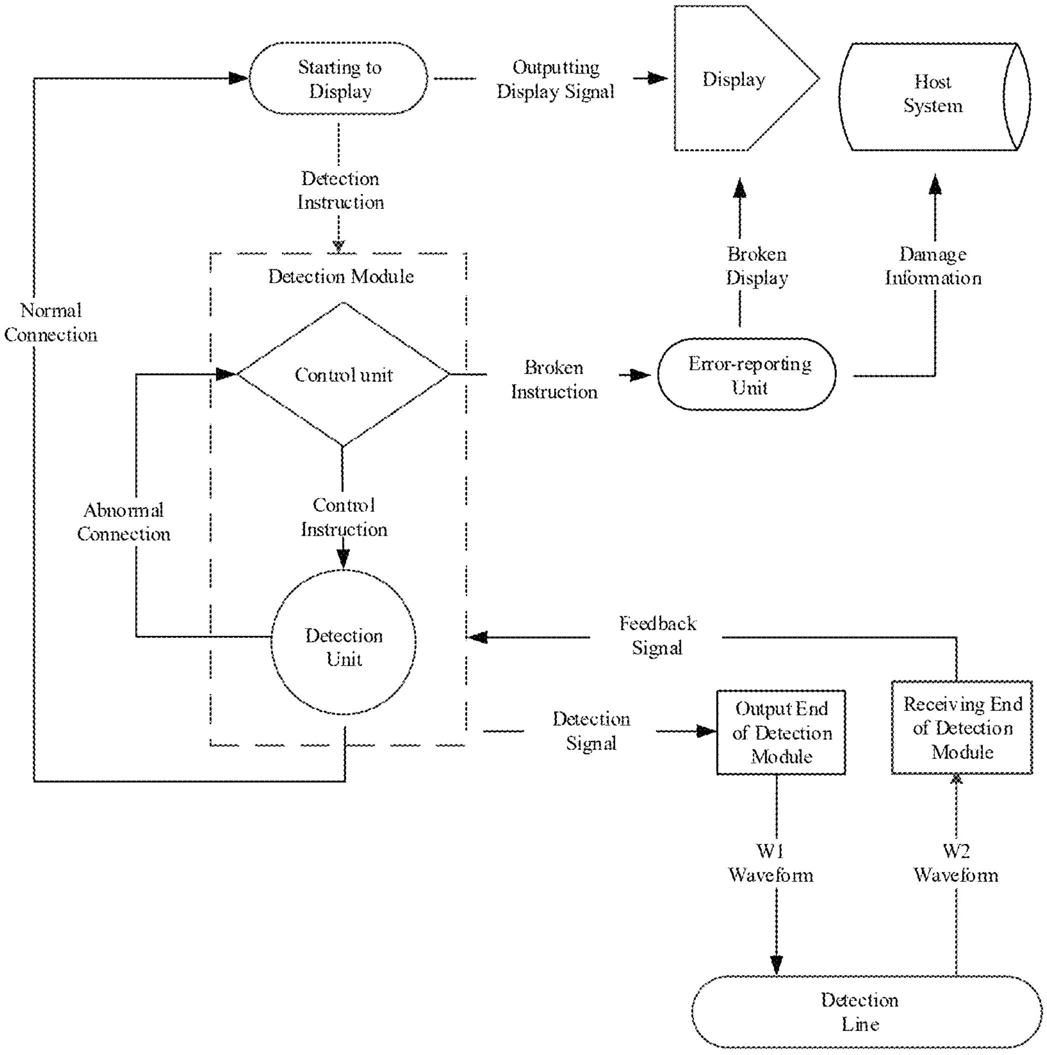
FIG. 10 schematically shows a schematic diagram of the detection process for detecting the fragmentation of the display panel in the detection method of the present application.

As shown in FIG. 10, for the process of detecting the fragmentation of the display panel 400, a detection instruction is generated at the start of display. The detection module 100 receives the detection instruction. The control unit generates a control instruction based on the detection instruction and sends it to the detection unit. The detection unit generates a detection signal based on the control instruction. The detection signal can be regarded as the W1 waveform. The W1 waveform that passes through the output end of the detection module 100 passes through the detection line 200. The temperature-sensing module 300 is provided on the detection line 200. The W1 waveform passes through the temperature-sensing module 300 to form the W2 waveform, that is, the feedback signal. The W2 waveform is fed back to the receiving end of the detection module 100. After receiving the feedback signal, the detection unit will determine the connection state of the detection line 200, that is, determine the fragmentation situation of the display panel 400. If the connection is normal, the display panel 400 starts to display, outputs a normal display signal, and completes the display. If the connection is abnormal, the detection unit sends a connection-abnormal signal to the control unit, and the control unit provides a broken instruction to the error-reporting unit. After receiving the broken instruction, the error-reporting unit outputs a broken display and provides broken information to the host system.

Figure 11:
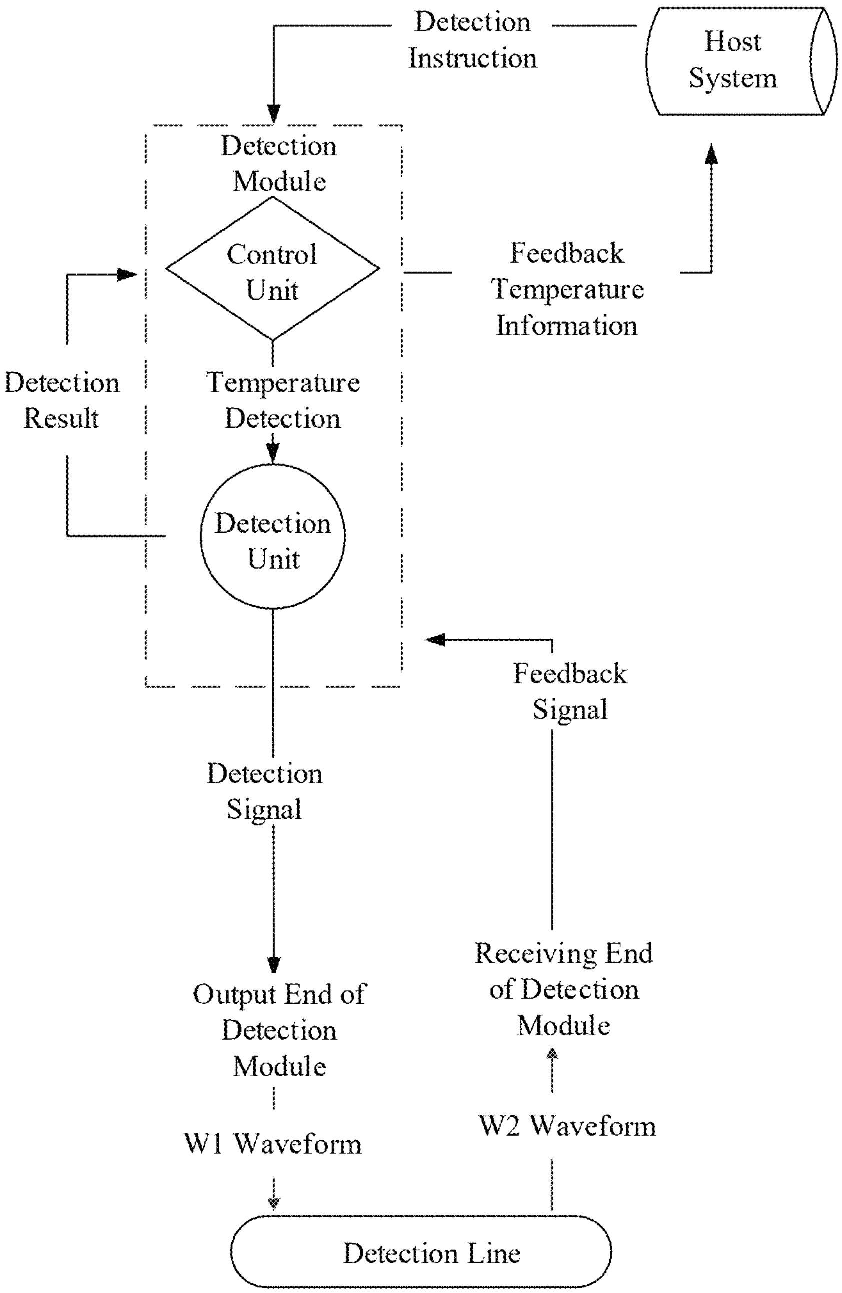
FIG. 11 schematically shows a schematic diagram of the detection process for detecting the temperature change of the display panel in the detection method of the present application.

As shown in FIG. 11, for the process of detecting the temperature change of the display panel 400, the host system sends a detection instruction to the detection module 100. The detection module 100 receives the detection instruction. The control unit generates a temperature-detection instruction based on the detection instruction and sends it to the detection unit. The detection unit generates a detection signal based on the temperature-detection instruction. The detection signal can be regarded as the W1 waveform. The W1 waveform that passes through the output end of the detection module 100 passes through the detection line 200. The temperature-sensing module 300 is provided on the detection line 200. The W1 waveform passes through the temperature-sensing module 300 to form the W2 waveform, that is, the feedback signal. The W2 waveform is fed back to the receiving end of the detection module 100. After receiving the feedback signal, the detection unit will obtain the temperature change of the display panel 400 and generate a detection result. The detection unit feeds back the detection result to the control unit. The control unit converts the detection result into temperature information and feeds the temperature information back to the host system.

The Third Embodiment

The present application also provides a display device. The display device includes a display panel 400 and the above-mentioned detection circuit. The detection module 100 and the temperature-sensing module 300 are provided in the non-display region 420 of the display panel 400 or at the edge of the display panel 400. The detection module 100 and the temperature-sensing module 300 are provided in the non-display region 420 or at the edge of the display panel 400, which can avoid the display region 410 and reduce the impact on the display screen.

The specific implementation and beneficial effects of the display device refer to the content of the above-mentioned detection circuit, and details are not repeated here.

Those skilled in the art will easily think of other embodiments of the present application after considering the specification and practicing the invention disclosed here. The present application is intended to cover any variations, uses, or adaptations of the present application. These variations, uses, or adaptations follow the general principles of the present application and include common knowledge or commonly used technical means in the technical field not disclosed in the present application.

It should be understood that the present application is not limited to the precise structure that has been described above and shown in the accompanying drawings, and various modifications and changes can be made without departing from its scope. The scope of the present application is only limited by the appended claims.

What is claimed is:

1. A detection circuit, applied to a display panel, comprising:

a display region and a non-display region surrounding the display region;

wherein the detection circuit comprises:

a detection module, provided on the display panel;

a detection line, with one end connected to an output end of the detection module, and another end extending along the non-display region, surrounding the display region, and connected to a receiving end of the detection module; and a temperature-sensing module, connected to the detection line;

wherein the output end of the detection module provides a detection signal, the detection signal forms a feedback signal that varies with temperature through the temperature-sensing module, the receiving end of the detection module receives the feedback signal and determines a connection state of the detection line and a temperature change of the display panel based on the feedback signal.

2. The detection circuit according to claim 1, wherein the temperature-sensing module comprises a first responsive switch, a resistance in the first responsive switch varies with temperature;

the first responsive switch is provided on the detection line, an input end of the first responsive switch is connected to the output end of the detection module through the detection line, and an output end of the first responsive switch is connected to the receiving end of the detection module through the detection line, and a control end of the first responsive switch is connected to a first power supply end, and the first power supply end provides a first control signal; and the control end of the first responsive switch responds to the first control signal, and the input end and the output end of the first responsive switch are conducted.

3. The detection circuit according to claim 2, wherein the temperature-sensing module further comprises a feedback resistor, an end of the feedback resistor is connected to the detection line between the first responsive switch and the receiving end of the detection module, and another end of the feedback resistor is connected to a ground line;

the feedback signal comprises a feedback voltage flowing through the feedback resistor and a feedback current flowing through the first responsive switch;

the detection module detects a magnitude of the feedback current to determine the connection state of the detection line; and the detection module detects a magnitude of the feedback voltage to determine the temperature change of the display panel.

4. The detection circuit according to claim 3, wherein the temperature-sensing module further comprises a protection resistor, the protection resistor is provided in a detection line between the output end of the first responsive switch and the feedback resistor;

the receiving end of the detection module is connected to a line between the protection resistor and the feedback resistor.

5. The detection circuit according to claim 3, wherein the temperature-sensing module further comprises a protection capacitor;

the protection capacitor is connected in parallel with the feedback resistor, and an end of the protection capacitor is connected to a detection line between the first responsive switch and the receiving end of the detection module, and another end of the protection capacitor is connected to the ground line.

6. The detection circuit according to claim 3, wherein the temperature-sensing module further comprises a first resistor and a second resistor, an end of the first resistor is connected to the first power supply end, and another end of the second resistor is connected to the control end of the first responsive switch;

an end of the second resistor is connected to a line between the first resistor and the first responsive switch, and another end of the second resistor is connected to the ground line; and the first power supply end provides a first voltage signal, and the first voltage signal is divided by the first resistor to form the first control signal.

7. The detection circuit according to claim 3, wherein the temperature-sensing module further comprises a second responsive switch and a third responsive switch;

an input end of the second responsive switch is connected to the output end of the first responsive switch, and an output end of the second responsive switch is connected to the feedback resistor;

an input end of the third responsive switch is connected to a control end of the second responsive switch, and an output end of the third responsive switch is connected to the ground line, and a control end of the third responsive switch is connected to a second power supply end;

the second power supply end provides a second control signal, a control end of the second responsive switch responds to the second control signal, and the input end and the output end of the second responsive switch are conducted; and the control end of the third responsive switch is pulled down to a ground voltage provided by the ground line, and the input end and the output end of the third responsive switch are conducted, and the feedback voltage is formed on the feedback resistor.

8. The detection circuit according to claim 7, wherein the feedback current in the first responsive switch is positively correlated with the temperature change of the display panel, and the second responsive switch is a P-channel Metal-Oxide-Semiconductor (PMOS) transistor, and the third responsive switch is a N-channel Metal-Oxide-Semiconductor (NMOS) transistor.

9. The detection circuit according to claim 3, wherein the ground line is provided in the non-display region and at least surrounds part of the display region.

10. A detection method, wherein the detection method detects a display panel based on a detection circuit, and the display panel comprises a display region and a non-display region surrounding the display region;

the detection circuit comprises: a detection module, a detection line, and a temperature-sensing module;

the detection module is provided on the display panel, one end of the detection line is connected to an output end of the detection module, and another end of the detection line extends along the non-display region, surrounds the display region, and is connected to a receiving end of the detection module; the temperature-sensing module is connected to the detection line;

wherein the detection method comprises:

controlling the output end of the detection module to provide a detection signal, wherein the detection signal is transmitted to the temperature-sensing module through the detection line, the temperature-sensing module forms a feedback signal that varies with temperature based on the detection signal; and controlling the receiving end of the detection module to receive the feedback signal and determining a connection state of the detection line and a temperature change of the display panel based on the feedback signal.

11. The detection method according to claim 10, wherein determining the connection state of the detection line and the temperature change of the display panel based on the feedback signal comprises:

obtaining a waveform of the feedback signal and comparing the waveform of the feedback signal with a waveform of the detection signal to obtain a waveform difference between the feedback signal and the detection signal; and determining the connection state of the detection line and the temperature change of the display panel based on the waveform difference.

12. The detection method according to claim 10, wherein the detection circuit further comprises: a first responsive switch, a second responsive switch, a third responsive switch, and a feedback resistor;

a resistance in the first responsive switch varies with temperature, the first responsive switch is provided on the detection line;

an input end of the first responsive switch is connected to the output end of the detection module through the detection line, and an output end of the first responsive switch is connected to the receiving end of the detection module through the detection line, a control end of the first responsive switch is connected to a first power supply end, and the first power supply end provides a first control signal, and an end of the feedback resistor is connected to the detection line between the first responsive switch and the receiving end of the detection module, and another end of the feedback resistor is connected to a ground line;

an input end of the second responsive switch is connected to the output end of the first responsive switch, and an output end of the second responsive switch is connected to the feedback resistor, and an input end of the third responsive switch is connected to a control end of the second responsive switch, and an output end of the third responsive switch is connected to the ground line, and a control end of the third responsive switch is connected to a second power supply end;

wherein controlling the output end of the detection module to provide the detection signal, the detection signal being transmitted to the temperature-sensing module through the detection line, and the temperature-sensing module forming the feedback signal that varies with temperature based on the detection signal comprises:

controlling the first power supply end to provide a first control signal, wherein the control end of the first responsive switch responds to the first control signal, and the input end and the output end of the first responsive switch are conducted, and the detection signal forms a feedback current that varies with temperature through the first responsive switch; and controlling the second power supply end to provide a second control signal, wherein the control end of the third responsive switch responds to the second control signal, and the input end and the output end of the third responsive switch are conducted, the control end of the second responsive switch is pulled down to a voltage of the ground line, and the input end and the output end of the second responsive switch are conducted, and the feedback current flows through the feedback resistor, and a feedback voltage is formed on the feedback resistor.

13. A display device, comprising a display panel and a detection circuit;

wherein the detection circuit is applied to the display panel and comprises:

a display region and a non-display region surrounding the display region;

wherein the detection circuit comprises:

a detection module, provided on the display panel;

a detection line, with one end connected to an output end of the detection module, and another end extending along the non-display region, surrounding the display region, and connected to a receiving end of the detection module; and a temperature-sensing module, connected to the detection line;

wherein the output end of the detection module provides a detection signal, the detection signal forms a feedback signal that varies with temperature through the temperature-sensing module, the receiving end of the detection module receives the feedback signal and determines a connection state of the detection line and a temperature change of the display panel based on the feedback signal;

wherein the detection module and the temperature-sensing module are provided in the non-display region of the display panel or at an edge of the display panel.

14. The display device according to claim 13, wherein the temperature-sensing module comprises a first responsive switch, a resistance in the first responsive switch varies with temperature;

the first responsive switch is provided on the detection line, an input end of the first responsive switch is connected to the output end of the detection module through the detection line, and an output end of the first responsive switch is connected to the receiving end of the detection module through the detection line, and a control end of the first responsive switch is connected to a first power supply end, and the first power supply end provides a first control signal; and the control end of the first responsive switch responds to the first control signal, and the input end and the output end of the first responsive switch are conducted.

15. The display device according to claim 14, wherein the temperature-sensing module further comprises a feedback resistor, an end of the feedback resistor is connected to the detection line between the first responsive switch and the receiving end of the detection module, and another end of the feedback resistor is connected to a ground line;

the feedback signal comprises a feedback voltage flowing through the feedback resistor and a feedback current flowing through the first responsive switch;

the detection module detects a magnitude of the feedback current to determine the connection state of the detection line; and the detection module detects a magnitude of the feedback voltage to determine the temperature change of the display panel.

16. The display device according to claim 15, wherein the temperature-sensing module further comprises a protection resistor, the protection resistor is provided in a detection line between the output end of the first responsive switch and the feedback resistor;

the receiving end of the detection module is connected to a line between the protection resistor and the feedback resistor.

17. The display device according to claim 15, wherein the temperature-sensing module further comprises a protection capacitor;

the protection capacitor is connected in parallel with the feedback resistor, and an end of the protection capacitor is connected to a detection line between the first responsive switch and the receiving end of the detection module, and another end of the protection capacitor is connected to the ground line.

18. The display device according to claim 15, wherein the temperature-sensing module further comprises a first resistor and a second resistor, an end of the first resistor is connected to the first power supply end, and another end of the second resistor is connected to the control end of the first responsive switch;

an end of the second resistor is connected to a line between the first resistor and the first responsive switch, and another end of the second resistor is connected to the ground line; and the first power supply end provides a first voltage signal, and the first voltage signal is divided by the first resistor to form the first control signal.

19. The display device according to claim 15, wherein the temperature-sensing module further comprises a second responsive switch and a third responsive switch;

an input end of the second responsive switch is connected to the output end of the first responsive switch, and an output end of the second responsive switch is connected to the feedback resistor;

an input end of the third responsive switch is connected to a control end of the second responsive switch, and an output end of the third responsive switch is connected to the ground line, and a control end of the third responsive switch is connected to a second power supply end;

the second power supply end provides a second control signal, a control end of the second responsive switch responds to the second control signal, and the input end and the output end of the second responsive switch are conducted; and the control end of the third responsive switch is pulled down to a ground voltage provided by the ground line, and the input end and the output end of the third responsive switch are conducted, and the feedback voltage is formed on the feedback resistor.

20. The display device according to claim 19, wherein the feedback current in the first responsive switch is positively correlated with the temperature change of the display panel, and the second responsive switch is a P-channel Metal-Oxide-Semiconductor (PMOS) transistor, and the third responsive switch is a N-channel Metal-Oxide-Semiconductor (NMOS) transistor.

* * * * *